(No Model.)
W. WEBSTER.
APPARATUS FOR CONDENSING STEAM.
No. 524,569. Patented Aug. 14, 1894.
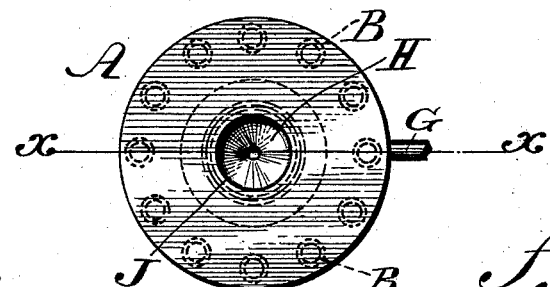
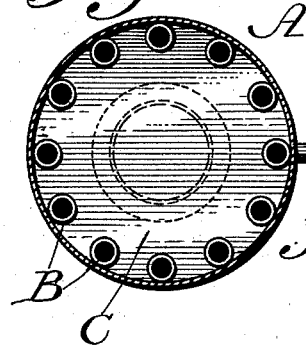
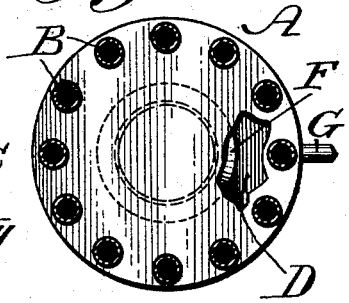
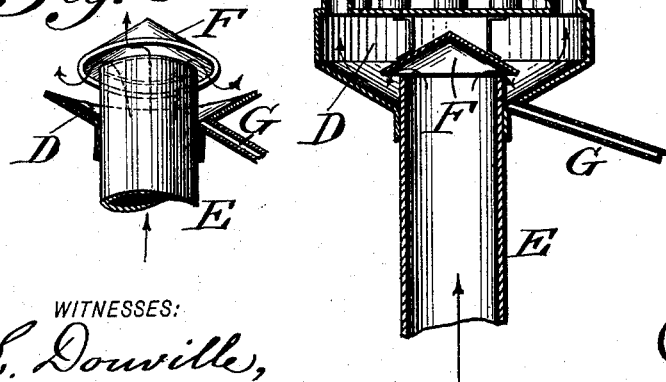
WITNESSES:
L. Douville,
O. F. Eagle.
INVENTOR
Warren Webster,
BY [signature]
ATTORNEY.

UNITED STATES PATENT OFFICE.

WARREN WEBSTER, OF MERCHANTVILLE, NEW JERSEY.

APPARATUS FOR CONDENSING STEAM.

SPECIFICATION forming part of Letters Patent No. 524,569, dated August 14, 1894.

Application filed October 6, 1892. Serial No. 447,999. (No model.)

*To all whom it may concern:*

Be it known that I, WARREN WEBSTER, a citizen of the United States, residing at Merchantville, in the county of Camden, State of New Jersey, have invented a new and useful Improvement in Apparatus for Condensing Steam, which improvement is fully set forth in the following specification and accompanying drawings.

My invention relates to an improvement in apparatus for condensing steam, and consists in adapting such apparatus to effect condensation by the action of the atmosphere or atmospheric air which is directed against the pipe or pipes or other receptacle or receptacles into which the steam is admitted so as to reduce the temperature thereof.

Figure 1 represents a top or plan view of an apparatus for condensing steam embodying my invention. Fig. 2 represents a vertical section thereof, on line x, x, Fig. 1. Figs. 3 and 4 represent horizontal sections on lines respectively y, y, and z, z, Fig. 2. Fig. 5 represents a perspective view of portion of the lower end of the apparatus detached.

Similar letters of reference indicate corresponding parts in the several figures.

Referring to the drawings: A designates an exhaust head formed of the pipes B, which are exposed to the atmosphere, and communicate at opposite ends with the chambers C and D respectively. Leading into the chamber D and having its upper end above the bottom of said chamber is the steam supply pipe E, above which is the hood F, which permits the steam to escape into said chamber D, but prevents the return of the water of condensation into said pipe E. The chamber D is provided with an outlet or drain pipe G, whereby the water of condensation may be collected or directed elsewhere, as required for use. Within the chamber C is supported an inverted conical vessel or trap H, whose bottom has an opening to return the water of condensation that is collected by said vessel into the chamber C, said vessel being below the discharge opening J of the chamber C.

The operation is as follows: Exhaust steam is directed by the pipe E into the chamber D, and from thence into the pipes B. Now as the latter are exposed to the atmosphere, and air circulates freely around the same, it is evident that the steam will be condensed in the pipes, the water of condensation then dropping or flowing into the chamber D, the bottom of which being conical directing the same to the pipe G, whereby it is conveyed from said chamber. Some of the steam may retain sufficient life to enter the chamber C and escape therefrom through the discharge opening J, and should the same condense in the chamber above the vessel H or in said opening J, or the connecting pipe of the latter, the water will fall or flow into said vessel H and escape therefrom through the open bottom thereof, and so enter the chamber C from whence it is directed through the pipes B into the bottom chamber D.

When the apparatus is placed outside of a building the natural draft or a good circulation of air is ordinarily sufficient to cause condensation, but when these do not exist the apparatus may be made effective by mechanical means, such as a fan or blower for directing a large volume of cold or fresh air freely against and around the pipes B, and thus cause the latter to maintain a low temperature, the effect of which is evident. The conical vessel H also, serves to deflect the water and steam that might be forced through the pipes B into the chamber C, preventing a straight course to the air so that the water will drop and the vapors pass on to the air in case of a surplus.

Having thus described my invention, what I claim as new, and desire to secure by Letters Patent, is—

1. In an apparatus for condensing steam, a head formed of a series of pipes exposed to the atmosphere, chambers connected with the ends of said pipes, a steam pipe extending into one of said chambers above the bottom thereof, and having a hood extending over said end, a drain pipe leading from said chamber, an opening in the end of the other chamber, and a trap with openings in its bottom in the latter mentioned chamber, said parts being combined substantially as described.

2. An apparatus for condensing steam consisting of a condensing head A formed of the pipes B, the chambers C and D connected with the ends of said pipes, the inlet pipes E projecting into the chamber D, the hood extending over the end of said pipe E, the drain pipe G leading from said chamber D, and the trap H constructed substantially as shown below the opening J in the chamber C, said parts being combined substantially as described.

WARREN WEBSTER.

Witnesses:
JOHN A. WIEDERSHEIM,
A. P. JENNINGS.

It is hereby certified that in Letters Patent No. 524,569, granted August 14, 1894, upon the application of Warren Webster, of Merchantville, New Jersey, for an improvement in "Apparatus for Condensing Steam," errors appear in the printed specification requiring correction as follows, viz: In line 89, page 1, the word "bead" should read *head*, and in line 2, page 2, the word "pipes" following the word "inlet" should read *pipe;* and that the said Letters Patent should be read with these corrections therein that the same may conform to the record of the case in the Patent Office.

Signed, countersigned, and sealed this 11th day of September, A. D. 1894.

[SEAL.]
                 JNO. M. REYNOLDS,
                  *Assistant Secretary of the Interior.*

Countersigned:
  S. T. FISHER.
    *Acting Commissioner of Patents.*